S. BARNES.

Toilet-Brushes.

No. 5,169. Reissued Dec. 3, 1872.

Witnesses.

E. N. Johnson

J. P. Crawford

Inventor.

Stephen Barnes per C. A. Dargin

Atty.

AM PHOTO-LITHOGRAPHIC CO. N.Y. (OSBORNE'S PROCESS.)

UNITED STATES PATENT OFFICE.

STEPHEN BARNES, OF NEW HAVEN, CONNECTICUT.

IMPROVEMENT IN TOILET-BRUSHES.

Specification forming part of Letters Patent No. 21,464, dated September 7, 1858; extended seven years; reissue No. 5,169, dated December 3, 1872.

DIVISION B.

*To all whom it may concern:*

Be it known that I, STEPHEN BARNES, of New Haven, in the county of New Haven and State of Connecticut, have invented a new and Improved Brush, of which the following is a specification:

*Nature and Objects of the Invention.*

My invention relates to brushes generally known as toilet-brushes.

Prior to the date of my invention, so far as known to me, brushes were made of wood, the blanks being perforated for the tufts of bristles, which were stuck in the perforations and held there by wire or thread passed through the loops in the bristles, or by pins inserted in the loops, as seen in the manufacture of tooth, nail, and other brushes. The top surface of the brush was then covered with a veneer or plate to cover the projecting ends of the bristles and finish the brush. Such brushes would not stand the action of water or oils, to which they were generally subjected, as the veneer or plate would crack and peel off, and the brush become unsightly, dirty, and unfit for use. My invention obviates these objections by producing a brush which is impervious to fluids, much cheaper in construction, more durable, and highly ornamental; and my invention consists in making a brush from composition by casting in dies or molds, so that the whole structure is solid, and a new article of manufacture.

*General Description.*

Figure 1:
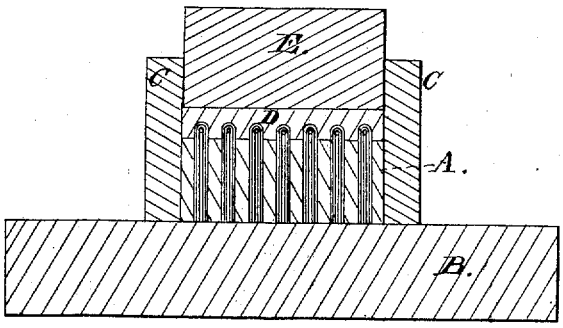
Figure 1 is a sectional elevation of my apparatus, showing a complete brush.
Figure 2:
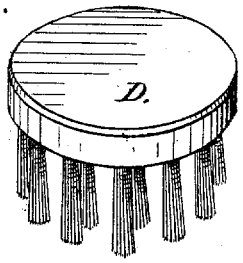
Fig. 2 is a perspective view of a brush when completed, though it is not of any of the forms or shapes in common use for a toilet-brush.
Figure 3:
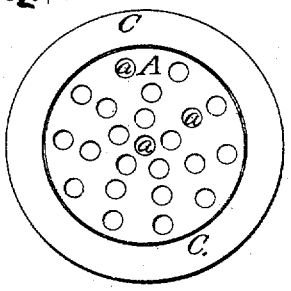
Fig. 3 is a plan view of the apparatus for making the brush.
Figure 4:
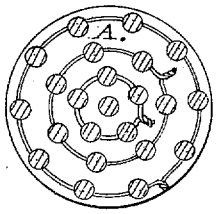
Fig. 4 is a plan of the tubular block or die in which the bristles are inserted, held, and secured for casting or cementing the body of the brush.

A is the removable block or die in which the bristles are inserted and held while the back of the brush is cast or cemented thereto. This block, which may be of any desired size or shape, has holes *a a* made therein, as shown in Fig. 3, into which the bristles are inserted in the desired tufts. The ends of the bristles are forced into the holes *a a* by the hand; or, if used double, they may be looped over a string or wire, the ends of which are inserted into the holes, and the bristles drawn in in that way. After the holes in the block or die are filled with bristles, as shown in Fig. 4, the block A with the bristles in it is placed upon the bed B or its equivalent, the bristles having been trimmed or cut to the proper length for the brush. The hoop C, which coincides with the die-block in shape, is then placed in position, as shown in Figs. 1 and 3, and the composition D poured in in a melted or plastic state, and is then pressed into form by the follower E. The loop C and follower E should be heated when the composition is poured, but not so hot as to injure the bristles by heat.

The form of the brush represented is not a common one for toilet or other uses, and it is chosen for its simplicity and ease of representation. In practice, other and such forms as may be desired for the brush will be used.

The composition of which I make the handle of the brush and secure the bristles thereto is made by mixing two parts of gum shellac with one part of Breckenridge coal, the latter pulverized, and both hot when mixed, to which is added one-eighth part plumbago. The proportions of these ingredients are not absolutely essential, as they may be varied, and coloring material may be inserted to give the brush back and handle any desired shade or color.

In making the brushes sufficient pressure must be given to fill the dies completely, and also to impart a polish on the parts of the die that are polished.

It will be observed that in the construction shown the bristles are supported by their ends resting upon the bed B, while at the same time the sides are so supported by the tubes as to prevent them from crippling. By this means the bristles are made to support themselves sufficiently against the pressure to which they are subjected in pressing up the handle of the brush, or, in other words, the backing of the composition in which the bristles are cast or secured.

Having fully described my said invention, what I claim as new therein, and desire to secure by Letters Patent, is—

As a new and improved article of manufacture, a brush cast or cemented in composition in dies or equivalents, and finished and ornamented by pressure, substantially in the manner described.

STEPHEN BARNES.

Witnesses:
LEVERETT L. THELP,
LUCIUS G. PECK.